(12) United States Patent
Kunakhovich et al.

(10) Patent No.: US 10,331,294 B2
(45) Date of Patent: Jun. 25, 2019

(54) AUGMENTED AUXILIARY DISPLAY

(71) Applicant: HRB Innovations, Inc., Las Vegas, NV (US)

(72) Inventors: Maksim Kunakhovich, Kansas City, KS (US); C. Taylor Brown, Cleveland, MO (US); Kabaleeswaran Sabapathi, Overland Park, KS (US); Kenneth Meade, Jr., Overland Park, KS (US); Umapathy Selvamoni, Olathe, KS (US)

(73) Assignee: HRB Innovations, Inc., Las Vegas, NV (US)

( * ) Notice: Subject to any disclaimer, the term of this patent is extended or adjusted under 35 U.S.C. 154(b) by 99 days.

(21) Appl. No.: 15/496,438

(22) Filed: Apr. 25, 2017

(65) Prior Publication Data

US 2018/0060018 A1  Mar. 1, 2018

Related U.S. Application Data

(60) Provisional application No. 62/380,133, filed on Aug. 26, 2016.

(51) Int. Cl.
| | | |
|---|---|---|
| *G06F 3/048* | (2013.01) | |
| *G06F 3/0481* | (2013.01) | |
| *G06F 3/14* | (2006.01) | |
| *G06F 1/16* | (2006.01) | |
| *G09G 5/14* | (2006.01) | |

(52) U.S. Cl.
CPC .......... *G06F 3/0481* (2013.01); *G06F 1/1649* (2013.01); *G06F 3/1454* (2013.01); *G06F 2203/04803* (2013.01); *G09G 5/14* (2013.01)

(58) Field of Classification Search
CPC .... G06F 3/1454; G06F 3/0481; G06F 1/1649; G09G 5/14
USPC .......................................................... 715/740
See application file for complete search history.

(56) References Cited

U.S. PATENT DOCUMENTS

| | | | | |
|---|---|---|---|---|
| 8,896,656 B2* | 11/2014 | Epstein | .................. | H04N 5/268 |
| | | | | 348/14.07 |
| 9,716,861 B1* | 7/2017 | Poel | ......................... | H04N 7/15 |
| 9,733,811 B2* | 8/2017 | Rad | ........................ | G06Q 50/01 |
| 9,852,388 B1* | 12/2017 | Swieter | ............ | G06Q 10/06313 |
| 9,921,726 B1* | 3/2018 | Sculley | .................... | H04W 4/04 |
| 9,955,318 B1* | 4/2018 | Scheper | ................ | H04W 4/043 |

(Continued)

OTHER PUBLICATIONS

Start the presentation and see your notes in Presenter view; Microsoft; Date Printed: Jul. 25, 2017; Date Posted: Unknown; Copyright 2017; <https://support.office.com/en-us/article/Start-the-presentation-and-see-your-notes-in-Presenter-view-4de90e28-487e-435c-9401-eb49a3801257>.

*Primary Examiner* — David Phantana-angkool
(74) *Attorney, Agent, or Firm* — Erise IP, P.A.

(57) ABSTRACT

A system for providing a second user of a computer system with an additional auxiliary display for displaying the information on the primary display and additional augmented information to help the user more easily understand the information displayed on the primary display is disclosed. For example, the second display may show the information on the primary display and also additional information summarizing the information for the benefit of the second display. The additional information may be generated by the computer system, retrieved from the Internet, or generated by another computer connected to the computer system.

20 Claims, 6 Drawing Sheets

(56) References Cited

U.S. PATENT DOCUMENTS

| | | | | |
|---|---|---|---|---|
| 2004/0002049 A1* | 1/2004 | Beavers | ............... | G09B 5/00 |
| | | | | 434/350 |
| 2012/0284640 A1* | 11/2012 | Sloyer | ............... | G06Q 10/10 |
| | | | | 715/753 |
| 2014/0304335 A1* | 10/2014 | Fung | ............ | H04L 67/38 |
| | | | | 709/204 |
| 2014/0356843 A1* | 12/2014 | Yang | ............ | G09B 5/00 |
| | | | | 434/362 |
| 2016/0110432 A1* | 4/2016 | Munesada | ......... | G06F 3/0482 |
| | | | | 715/783 |

* cited by examiner

AUGMENTED AUXILIARY DISPLAY

RELATED APPLICATION

This non-provisional patent application claims priority benefit, with regard to all common subject matter, of earlier-filed U.S. Provisional Patent Application No. 62/380,133 filed Aug. 26, 2016 and entitled AUGMENTED AUXILIARY DISPLAY. The identified earlier-filed provisional patent application is hereby incorporated by reference in its entirety into the present application.

BACKGROUND

1. Field

Embodiments of the invention generally relate to displaying information from computer systems and, more particularly, to adding an augmented auxiliary display to a computer system to allow an additional party to review information displayed on the primary display and additional, related information.

2. Related Art

Traditionally, clients working with professionals have been unable to see the information being reviewed by the professional without the professional turning the monitor around to face them. However, this renders the professional unable to continue reviewing the information until the client has finished. Prior attempts to address this issue have involved mirrored displays, where identical information is displayed on two monitors, one for the client and one for the professional. However, such solutions are unsatisfactory because the client may not have the context or the background to understand all of the information being reviewed by the professional without aid. As such, there is a need for an augmented auxiliary display that can present the information displayed on a primary display, together with additional context to allow a client or other customer to understand it more easily.

SUMMARY

A first embodiment of the invention addresses the above-described need by providing for a computer system with multiple displays having a shared display region and a non-shared display region. In particular, in a first embodiment, the invention includes a system for displaying information to a first user and a second user, comprising a computer system connected to a first display and a second display, wherein the first display displays a shared screen region, wherein the second display displays the shared screen region, wherein the second display further displays a non-shared screen region, wherein the first display does not display the non-shared screen region, and wherein the non-shared screen region displays information to assist the second user in understanding the information on the shared screen region.

A second embodiment of the invention provides for a non-transitory computer-readable media storing computer-executable instructions that, when executed by a processor, perform a method for displaying information on multiple displays having a shared display region and a non-shared display region. In particular, in a second embodiment, the invention includes a media for displaying information to a first user and a second user, displaying the shared screen region to the first user on a first display, displaying the shared screen region to the second user on a second display, displaying, in a non-shared screen region to the second user on the second display, information to assist the second user in understanding information displayed in the shared screen region, wherein the first display does not display the non-shared screen region to the second user, displaying, in an additional non-shared screen region to the first user on the first display, information to assist the first user in relating information to the second user, and wherein the second display does not display the additional non-shared screen region.

A third embodiment of the invention addresses the above-described need by providing for a method for displaying information to a shared region and a non-shared region. In particular, in a third embodiment, the invention includes a method for displaying information to a first user and a second user, comprising a computer system connected to a first display and a second display, wherein the first display displays a shared screen region, wherein the second display displays the shared screen region, wherein the second display further displays a non-shared screen region, wherein the first display does not display the non-shared screen region, wherein the non-shared screen region displays information to assist the second user in understanding the information on the first display, and wherein the second user edits the non-shared information displayed in the non-shared region of the second display and the shared information displayed in the shared region of the first and second displays.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 5:
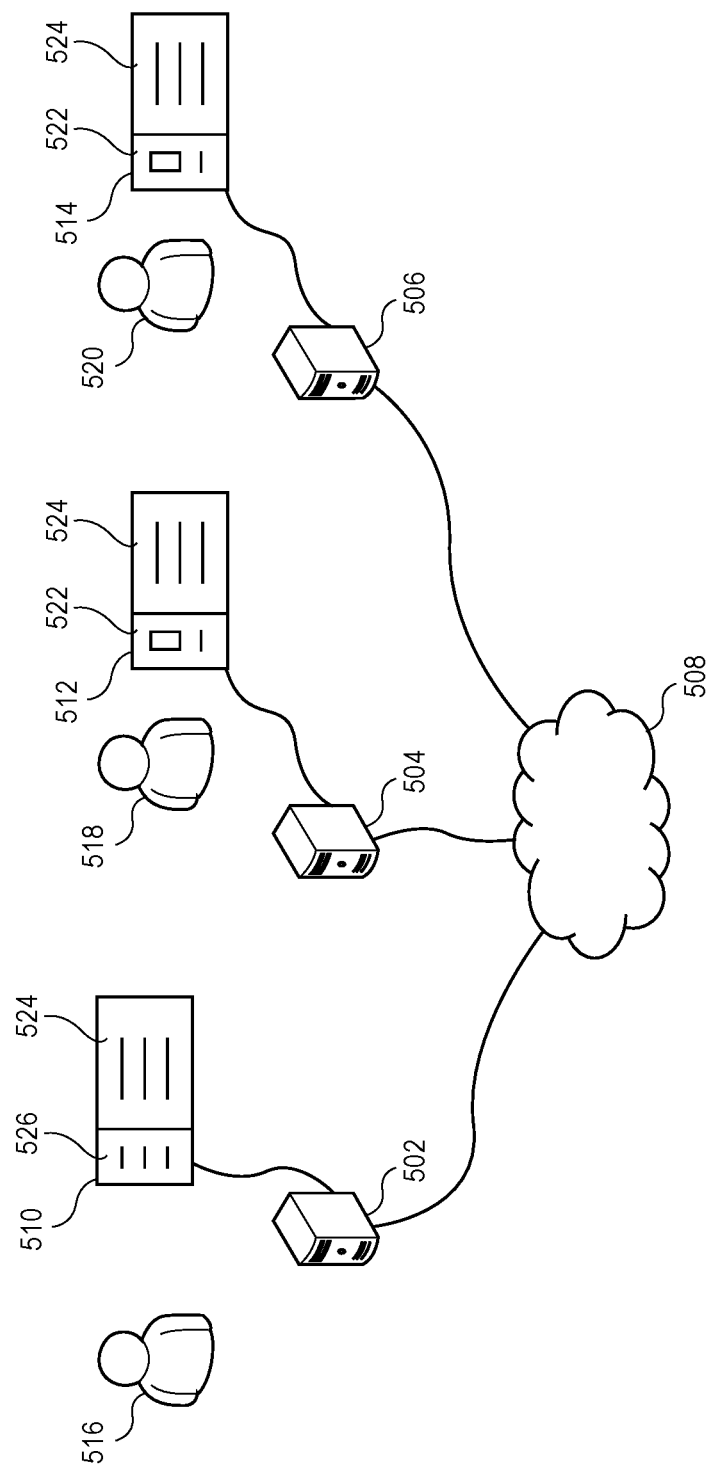

FIGS. 4A, 4B, 4C, and 4D depict exemplary display configurations;

FIG. 5 depicts an exemplary embodiment of the invention; and

Figure 6:
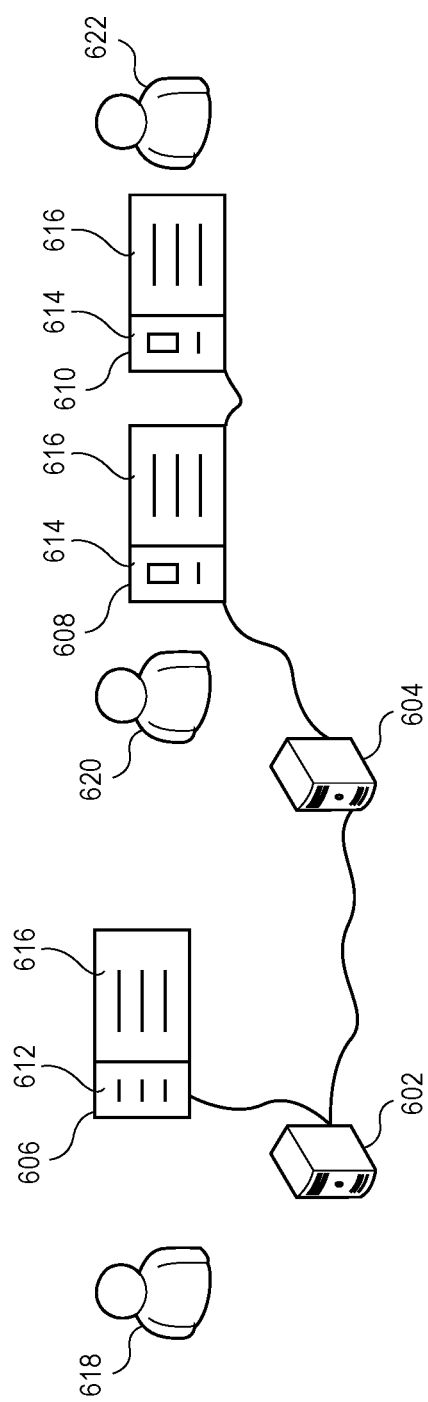

FIG. 6 depicts an exemplary embodiment of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

At a high level, embodiments of the invention provide for an augmented auxiliary display that can present the information displayed on a primary display, together with additional context to allow a client or other customer to understand it more easily. The information displayed on the augmented display may not be visible to the user of the primary display, and that user might have their own non-shared display region that is not visible on the augmented auxiliary display.

The subject matter of embodiments of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art, and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments, but is not necessarily included. Thus, the technology can include a variety of combinations and/or integrations of the embodiments described herein.

Figure 1:
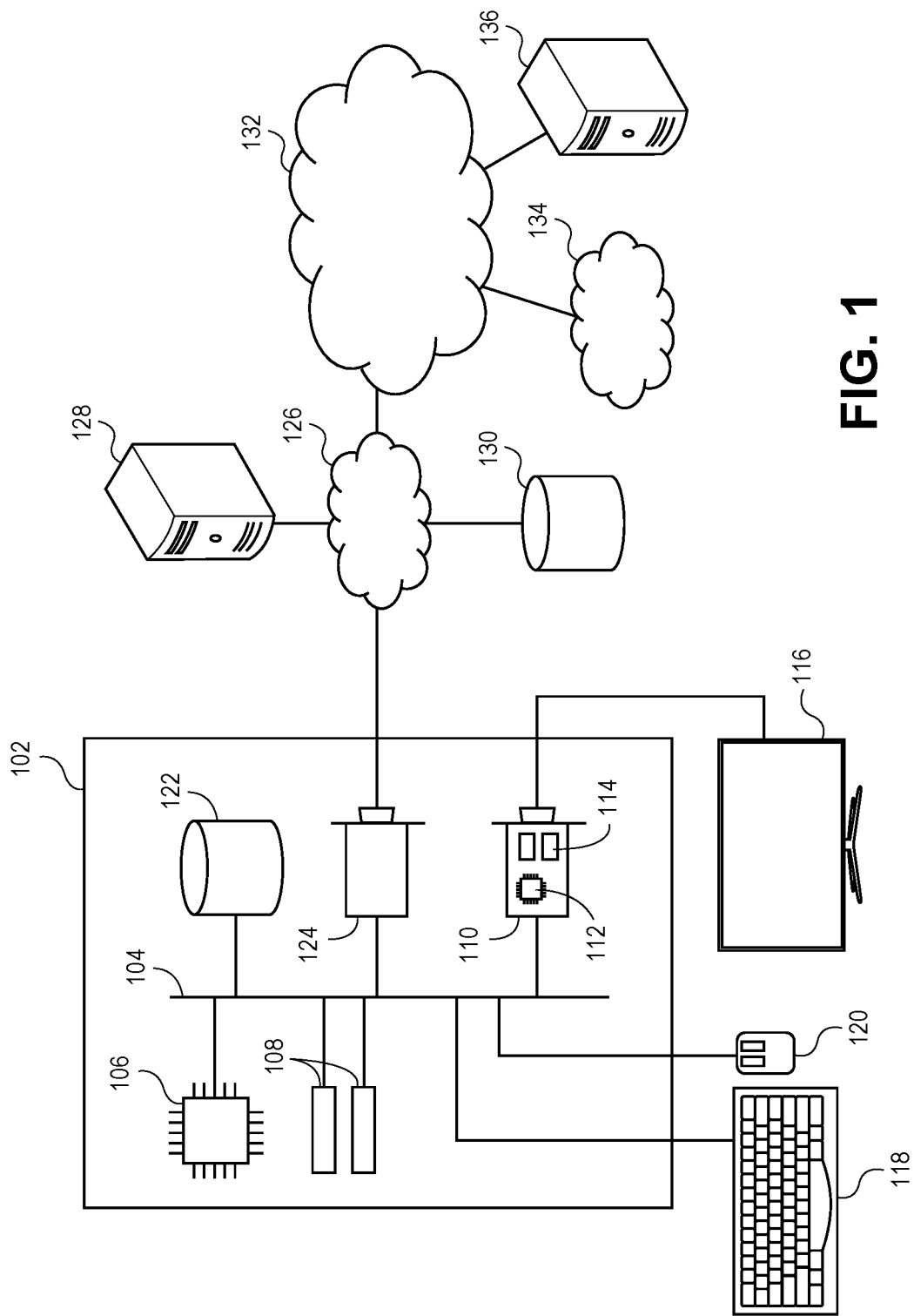
FIG. 1 depicts an exemplary hardware platform for certain embodiments of the invention.

Turning first to FIG. 1, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules. Also attached to system bus 104 is graphics card 110. In some embodiments, graphics card 104 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removeably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-usable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2:
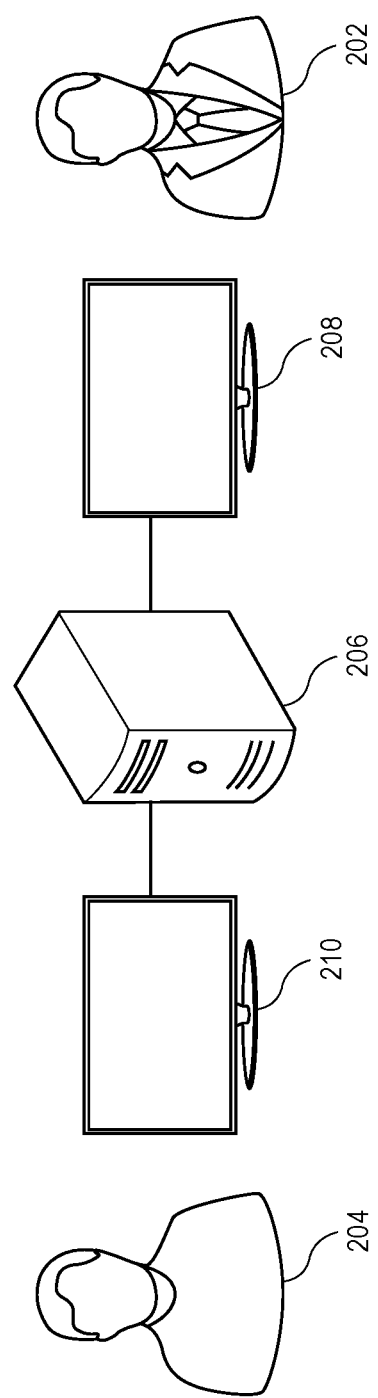
FIG. 2 depicts another exemplary computer platform suitable for practicing embodiments of the invention.

Turning now to FIG. 2, another exemplary computer platform suitable for practicing embodiments of the invention is depicted and referred to generally by reference numeral 200. As depicted, professional 202 and customer 204 are jointly reviewing information from computer system 206 on their respective displays 208 and 210. Conventionally, multiple displays attached to computer system 206 would be controlled by a single user and display either identical information or completely different information. However, embodiments of the invention provide for joint control with overlapping but distinct displays, as described in greater detail below.

As an exemplary scenario for illustrating the uses of the invention, professional 202 may be a doctor reviewing medical documents (for example, x-rays or test results) with customer 204 being a patient. Alternatively, professional 202 may be a teacher reviewing instructional material or coursework with customer 204 being a student. Similarly, professional 202 may be a lawyer, accountant, tax professional or member of any other profession with customer 204 being the corresponding client. Alternatively, professional 202 and customer 204 may be peers, such as two players of a game.

In some embodiments, computer system 206 may be a single desktop computer, laptop computer, server computer, tablet, smartphone, or any other computing platform as described above with respect to FIG. 1 that controls both display 208 and display 210. In other embodiments, computer system 206 comprises two or more communicatively coupled computers, with distinct computers controlling display 208 and 210. The computers may be directly connected by wire (e.g. Ethernet cable), or connected remotely or wirelessly (e.g., via WiFi, or Bluetooth). Alternatively, display 208 and/or display 210 may be integrated into one or more computers of computer system 206. For example, computer system 206 may be a tablet with an externally connected display, or computer system 206 may include a conventional computer controlling display 208 and a tablet integrating display 210. In some embodiments, more than two displays and two principals may be connected to computer system 206. For example, three, four, or more displays (each with or without an associated principal) may be attached.

Devices such as computers and displays may be paired in a number of ways. The Internet Protocol (IP) address or domain name of a computer may be used when signing in over a network. This address or name may be used to identify a computer and allow preset login information. A login may be required, in which case the computer 208 is then matched with the computer 210 used by the professional 204, according to preferences submitted by the customer 202, or the professional 204, or as matched by the professional company. The match may be made according to the customer 202 inputs to provide the best service. The information may be stored in memory 114 or data store 122 so connection is automatic upon login by either the professional 202 or the customer 204. The connection may be local and the computers connected by wire. This provides a face to face interaction that, in some instances, may be required. It also may be beneficial for the computers or displays to connect remotely. The device used by the customer 204 may be a personal computer or a personal mobile device.

The interaction between the professional 202 and the customer 204 may be face to face or remote. The professional and the client may use a video chat, voice chat, email, Morse code, a messaging application or any other form of online, cable, or telephone communication.

Customer 204 may arrive at or otherwise interface with a system 100. In the embodiment illustrated in FIG. 2, the customer 204 may come to the business location of the professional 202 or the professional 202 may visit the customer 204 at a remote location. The customer 204 and the professional 202 may communicate face to face. In other embodiments, the interaction may be via network 126.

The professional 202 and the customer 204 may have personal identification numbers or passwords that are connected to personal accounts. The accounts may link the professional 202 and the customer 204 to a particularly prescribed function related to the software based on the information on the account. The professional 202 and the customer 204 may also be provided with different types of accounts. Some accounts may be previously existing, such as associated with a tax return preparation program. Each type of user account may provide their respective users with unique roles, capabilities, and permissions with respect to implementing embodiments of the invention. For example, professional 202 may be provided with an account, associated with embodiments of the invention, that assists in providing tax preparation advice to the customer 204. Additionally, the professional 202 may be provided with an account that permits professional 202 access to embodiments of the invention that are applicable to accessing documents, verifying the identity of customer 204, preparing the tax return of customer 204, etc. In addition, the professional 202 may be provided with any number and/or any specific types of accounts to carry out the necessary functions.

Upon the professional 202, or the customer 204, logging in to the electronic resource for the first time, they may be required to provide various pieces of identification information to create their respective accounts. Such identification information may include, for instance, personal name, business name, email address, phone number, finger prints, retinal scan, or the like. Upon providing the identification information, the customer 204 and/or professional 202 may be required to enter (or may be given) a username and password, which may be required to fully access the user account.

Once an account has been established, embodiments of the invention may be responsive to user input. As defined herein user input may be received from a variety of computing devices including but not limited to the following: desktops, laptops, calculators, telephones, smartphones, or tablets. The computing devices may receive user input from a variety of sources including but not limited to the following: keyboard, keypads, mice, trackpads, trackballs, pen-input devices, printers, scanners, facsimile, touchscreens, network transmissions, verbal/vocal commands, gestures, button presses or the like. The customer 204 and professional 202 may interface with a computer program and save to memory. The professional 202 may have saved information about the customer 204 that may help customer service and satisfaction as well as increase efficiency. The customer 204 may have saved information about the professional 202 or notes about previous meetings that may help the customer 204 or the professional 202 in tax preparation, conducting business, gaming, chatting, social networking or whatever the preferred functionality utilized may be.

Information saved to memory during any session by customer 204 and professional 202 may be accessed by the professional 202 given that the professional 202 has been granted access. This access may be granted by the customer 204 upon request or may be unsolicited. The professional 202 and the customer 204 may have confidential information stored to memory, that the professional 202 may not access. The professional 202 and the customer 204 may have password, fingerprint, retinal, or any other type of security or protection for any confidential information stored to memory.

Figure 3:
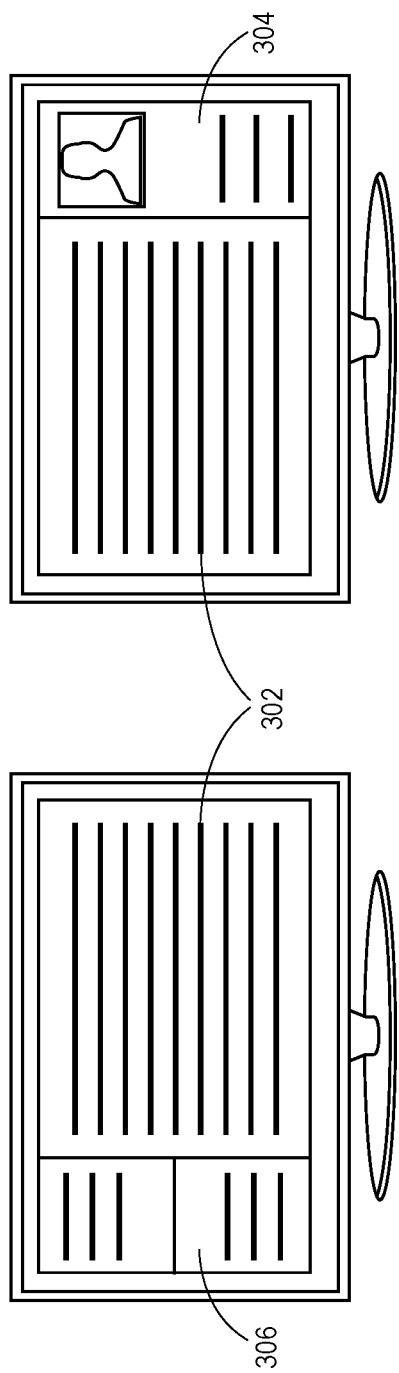
FIG. 3 depicts a schematic depiction of the shared and non-shared portions of the primary and augmented auxiliary displays in a particular embodiment of the invention.

In reviewing the information on display 208 and 210, there may be a need for a shared display area as depicted in FIG. 3. For example, a tax professional reviewing a tax return with a client might wish to have the tax forms displayed on both display 208 and 210. However, there may also be a need for a non-shared display area on one or both of display 208 and display 210. For example, the tax professional might wish to have an area dedicated to the display of tax code, which could be uninteresting or confusing to the client. Similarly, the client may wish to have a dedicated area for displaying summary information, advertising, or other information unnecessary to display to the tax professional.

As another example, consider two peer users playing a card game. The shared display area might correspond to the common game table, while the display area specific to display 208 and display 210 might correspond to the respective users' hands. One of skill in the art will appreciate that a wide variety of scenarios exist where it is desirable to have a shared display and one or more individual display areas that it is unnecessary or undesirable to share. In some embodiments, customer 204 controls the non-shared display portion of 210 (for example, using a mouse and keyboard or touch screen), and professional 202 controls the non-shared portion of display 208 and the portion of the display shared between display 208 and display 210. In other embodiments, customer 204 controls the shared portions of display 208 and 210. Customer 204 and professional 202 may jointly control the shared portion 302 of displays 208 and 210. The customer 204 may control the non-shared portion of display 208. For example, the display may need the personal identification number of user 204 before proceeding. Upon receiving input from user 204 a signal is presented to professional 202 indicating that the input has been received. In yet another embodiment, user 204 may control the shared region 302 and non-shared regions 304, and 306 of either or both displays 210 and 208. When an input from user 204 is received either or both portions of display 210 and 208 change. Also, a first change made by the first user 204 to information displayed in the shared screen region 302 may be reflected in the shared screen region 302 of the second display 208 and a second change made by the first user 204 to information displayed in the shared screen region 302 may not be reflected in the shared screen region 302 of the second display 208.

Referring again to FIG. 3, a schematic depiction of the shared and non-shared portions of displays 208 and 210 is depicted and referred to generally by reference numeral 300. Screen region 302 is shared between display 208 and display 210. Screen region 304 is specific to display 208 and screen region 306 is specific to display 210. Thus, display 210 does not display screen region 304 and display 208 does not display screen region 306. In some embodiments, display region 304 or display region 306 may not be present, leaving only the shared display region and a single non-shared display region. In those embodiments with more than two displays, there may be any number of non-shared regions up to the number of displays.

One of skill in the art will appreciate that the shared and non-shared regions may be different shapes and sizes and may overlap in different ways, as advantageous to the user. The regions may be bordered creating a region that may be triangular, quadrilateral, pentagonal, or any other shape. The enclosed region may not have straight lines or may have some straight lines with other lines being arcs, waves, arbitrary, or geometrically optimized for space savings or ease of use. The regions may be defined by the program or by the user. The regions may also be defined by the program but edited by the user. For example, referring to FIG. 2 and FIG. 3, the user 204 may want to view a shared region 302 only. This may be performed by minimizing the non-shared region 304. Conversely, this may also be accomplished by maximizing the shared region 302. Possibly the user 204 wants the shared region 302 above, below, to the right, or to the left of the non-shared region 304. This may be accomplished in numerous ways. For example, the user 204 may drag and drop the shared region 302 to an upper portion of the screen. This causes the non-shared region 304 to move to the lower portion of the screen, thus displaying the shared region 302 above the non-shared region. In another example, the user 204 may want to view the shared region 302 overlaid with the non-shared region 304. The user 204 may double click the shared region 302 causing it to be viewed over the non-shared region 304 then drag the shared region 302 anywhere on the screen, thus viewing the shared region 302 overlaid with the non-shared region 304. The previous examples depict the user manipulating the shared region 302, however the non-shared region 304 may be the source of manipulation as the user 204 desires. The previous examples are in no way limiting, and the shared and non-shared screen regions may be moved, adjusted, and manipulated in different ways and by different methods than presented here.

In another exemplary embodiment, the information on a non-shared region 306 may be transferred to the shared region 302. The professional 202 may view information displayed on non-shared region 306 that may be helpful to user 204. The professional 202 may transfer information from non-shared region 306 to shared region 304 in a variety of ways. For example, the information may be text. The professional 202 may highlight the text and drag and drop the sentence to a location in the shared region 302. The professional 202 may cut the sentence from the non-shared region 306 and paste the sentence to a location in the shared region 302. A screenshot of the sentence may be taken and inserted in shared region 302. These information transfer options may also apply to pictures, symbols, equations, or any other bit of information displayed in the non-shared region. These are examples for illustrative purposes only, thus information transferred from one region to another is not limited to transfer operations listed.

One of skill in the art will appreciate that the content to be displayed in each region may be generated in a variety of ways, depending on the content being displayed and the precise embodiment of computer system 206. For example, if computer system 206 is a single computer then that computer may generate all content, with different display regions mapped to different segments of GPU memory 114. For example, the operating system for computer system 206 might enforce memory protection such that the display port to which display 208 is connected cannot access the memory storing the information exclusively for display on 210, and vice versa. In this way, for example, each of the above-described players playing a card game can be prevented from viewing the other player's hand. Alternatively, if display 208 and display 210 are connected to different computers, information from display 208 can be transferred to display 210 (or vice versa) in a variety of fashions. For example, streaming video or screenshots could be used to communicate the shared screen region between the computers. In other embodiments, a higher-level protocol (such as a desktop sharing protocol) or a lower-level protocol (such as Digital Video Interface (DVI)) can be used.

In other embodiments, the supplementary information displayed on screen region 304 and/or screen region 306 can be automatically generated based on the information in screen region 302. For example, if customer 204 is a taxpayer, professional 202 is a tax preparer and they are reviewing tax forms, then display region 302 might display the tax forms and display region 306 might display a continually updated summary of the tax-preparation process. In some embodiments, the same computer of computer system 206 that is preparing the tax return might generate this summary. In other embodiments, screen region 302 is generated by the computer of tax professional 202 and display 210 is part of a separate computer (for example, a tablet) for client 204, which receives data for screen region 302 and, based on the received data, also generates summary data for display in screen region 306. The separate computer for client 204 can then display the received data, wrapped with the generated summary data.

Figure 4A:
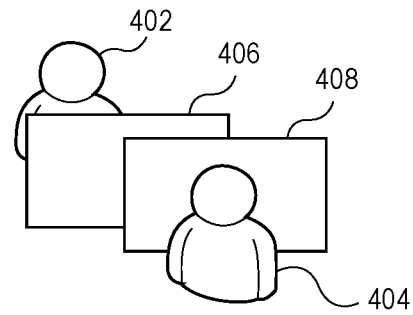
Figure 4B:
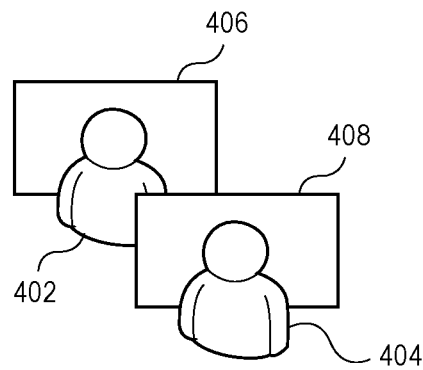
Figure 4C:
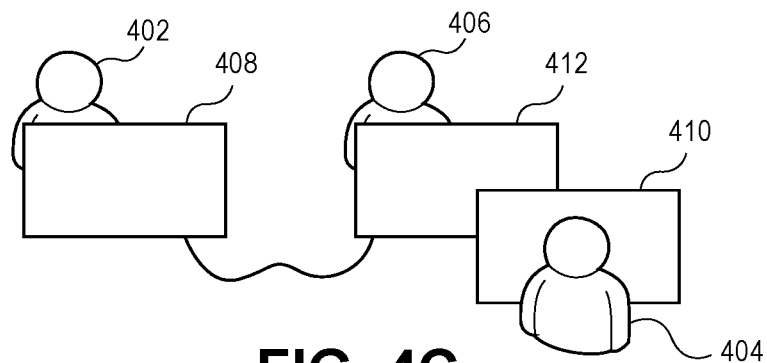
Figure 4D:
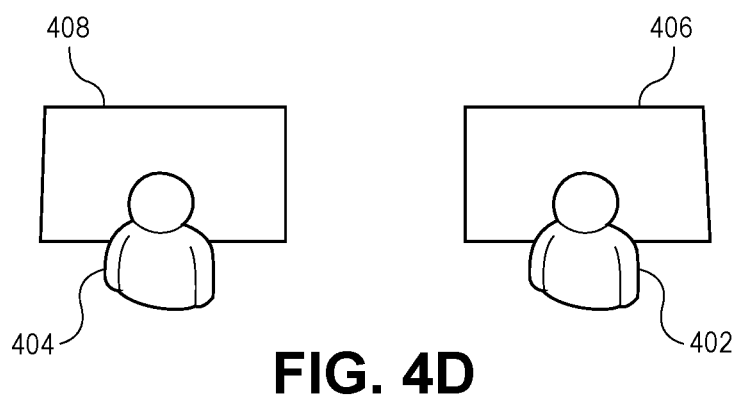

The orientation of displays relative to one another may be integral to the functionality. Referring now to FIGS. 4a-4d, four possible display orientations are presented, but are in no way limiting to the invention. In some embodiments, as presented in FIG. 4a, it may be desirable to have displays 406 and 408 oriented in a reciprocal way that allows only the professional 402 to view display 406 and only the customer 404 to view display 408. As presented in FIG. 4b, it may be desirable to stagger the displays 406 and 408. This may allow customer 404 to view display 406 and display 408, while professional 402 may only view display 408. Looking now to FIG. 4c, it may be desirable to have the reciprocal orientation as before, but with multiple customers. Customer 402 may be seated side-by-side with customer 406 viewing displays 408 and 412 respectively, and both customers 402 and 406 reciprocal to professional 404 viewing display 410. In FIG. 4d displays 406 and 408 are stationed side-by-side for ease of view by both customer 404 and professional 402. The display orientations presented here are exemplary and in no way, limit possible orientations. The displays 406 and 408 may be oriented as needed.

FIG. 5. depicts yet another embodiment of the invention. In this exemplary scenario, the users 516, 518, and 520 may use computers 502, 504, and 506 respectively. Three users are illustrated for simplicity though one of skill in the art would appreciate that it may not be limited to this number, and many more users, computers, and displays may be involved. It should also be noted that though the displays are oriented in a side-by-side configuration in FIG. 5 they may be oriented in any way that may benefit the overall functionality of the embodiment of the invention. Users 518 and 520 may be patients, customers, clients, students, or any other occupation related to embodiments of the invention. User 516 may be a professional. Computers 502, 504, and 506 are connected via network 508 which may be network 126. Network 508 may either be local or non-local. Computers 502, 504, and 506 are connected to displays 510, 512, and 514 respectively. Displays 510, 512, and 514 have a shared region 524. Displays 512 and 514 have a selectively shared region 522 that is not shared with 510. Display 510 has a non-shared region 526. The user 520 and user 518 may also be oriented differently by swapping places. In each configuration, customer 518, customer 520, and professional 516 may be positioned to view displays 510, 512, and 514 at will.

In an embodiment, customers 518 and 520, and a professional 516, may be exemplified in a tax-preparation scenario. Customer 518 viewing a display 512 and a customer 520 viewing a display 514 may share information on a shared region 522 that is not shared on display 510 viewed by a tax professional 516. This scenario may be convenient when the customer 518 and the customer 520 are a married couple filing jointly or not filing jointly. It also may be useful for customers 518, 520, and the professional 516, to have a shared region 524 and each customer 518 and 520 to have a shared region 522 that is not shared with the professional 516. Customer 518 and customer 520 may have information that is the same, such as address, gross household income, and so forth. Sharing information may reduce time by allowing customer 518 to fill out information that pertains to both customers 518 and 520 on the shared screen region 522 that is not shared with professional 516. Customer 520 may also simultaneously fill out information that pertains to customer 520 on the shared region 524 shared with the professional 516 and customer 518. A non-shared region 526 may provide the tax professional 516 with useful information that may help customers 528 and 520 in filling out the tax forms simultaneously. This may be relayed to the customers 518 and 520 verbally or electronically through shared region 524. This may be advantageous by reducing the time taken in filling out the forms since customer 518 and customer 520 do not fill out the forms consecutively or separately.

One of skill in the art will appreciate that the additional data displayed in screen regions 526 and 524 can be based on more than the data displayed in screen region 524. Computer system 504 (however it is embodied) can connect to one or more external computers via network 508 or Internet 132 to retrieve tax forms, prior-year tax data, help articles, or any other form of information useful to customers 518 and 520. Similarly, the computer of tax professional 516 can retrieve and display relevant laws, best practices, or other information that would not be meaningful to customers 518 and 520.

In another exemplary scenario, players of a game may compete as team members. In this scenario players 518, 520, and 516 are playing a game with players 518 and 520 being teammates. All players 518, 520, and 516 may have a shared screen region 524 on their respective displays 512, 514, and 510. Display 510 has a non-shared region 526 while displays 512 and 514 have a shared region 522 that is not shared with display 510. Again, considering the card game example, a game played by the players 518, 520, and 516, may be a team game where it is allowable for players of the same team 518 and 520 to view each other's cards. In this case, it would be advantageous to electronically allow the players 518 and 520, of the same team, to view the shared region 522 of the screen that contains information that may give the team an advantage in the game. Player 516 may be an individual, or on a team, but is not a teammate of players 518 and 520. This creates selectively shared region 522 between computers 504 and 506, and displays 512 and 514, that is not shared with computer 502 and display 510.

In an exemplary scenario, selectively sharing information to multiple chosen users 518 and 520 via a shared region 522, that is not shared with a user 516, may also be useful in military simulation or first person shooter games where the users 518, 520, and 516 are players of a game. The shared region 524 of displays 512, 514, and 510 may be a battlefield while a region 524 that may be shared between teammates 518 and 520, and not shared with player 516, displays life statistics, or weapon information of the avatar of players 518 and 520. For strategic purposes, it may be useful for team members 518 and 520 to know the avatar information of each team member 518 and 520 on the shared region 522. All, or part, of the avatar information of the team members 518 and 520 may be continuously shared to a team member via shared region 522, or shared upon request. The team member 518 may share information with team member 520 via shared screen region 522 upon request. However, this may be inconvenient in that it takes time and focus away from the game. The avatar information from team member 518 may be shared automatically upon request by team member 520 without a reaction from team member 518 if this preset is chosen.

Continuing with this example, it may be beneficial to share information from a selectively shared region 522 of players 518 and 520 to a shared region 524 for viewing by players 518, 520, and 516. An indicator to all players of a shared screen may appear when a player has received an award, or when their life is at a predetermined level, or any number of non-shared attributes may be shared based on the game or code instructions. This may be an icon, a symbol, text, or any other method of visual notification.

In the previous example the computers 502, 504, and 506 were connected via network 508. In embodiments, two or more monitors may be connected via a daisy-chain method. Referring to FIG. 6, two computers 602 and 604 are connected by wire. Display 606 has a non-shared region 612 and a region 616 that is shared between displays 608 and 610. Displays 608 and 610 have a shared region 614 that is not shared with display 606. This scenario allows for multiple viewing of the regions 614 and 616. In general, daisy-chaining monitors would only allow for the same display regions in each successive display. This scenario may be beneficial, as in the previous descriptions, for tax-preparation or gaming. This method may only be used when it is convenient to have the same signal processed through each monitor. Though, using a different output from a computer a separate signal may be sent to a separate set of daisy-chained displays. This provides at least two displays with a shared and a non-shared region where each display may be daisy-chained to as many monitors as needed.

In an exemplary embodiment, depicted in FIG. 6, the display 606 may be used for teaching purposes and displays 608 and 610 may be used for learning purposes. In a classroom setting when teachers need to review a student's work on a computer they must go to the student's computer and look over the student's shoulder. Doing this individually between each student wastes a large amount of time. In this scenario, a teacher 618 may be presenting information to students 620 and 622. Though two computers 602 and 604 are illustrated one computer or more may be used. The teacher may be presenting the students information via a shared display 616. A non-shared display 612 may display the teacher's handbook or notes to aid the teacher 618 in presenting information to the students. Information may be passed directly between the non-shared regions 612 and 616, enabling the students 620 and 622 to view the information. The students 620 and 622 may be able to interact with the teacher shared region 616 or the student shared region 614. This provides an immediate interactive teaching platform between teacher and student. When each student 620 or 622 makes an update on the shared screen 616 an indicator of which student made the update may appear. This indicator may be a student number or the student name depending on if it is desirable for the other students to know which student made the update. The teacher 618 may be the only person that is notified or knows which student has made the request.

The daisy-chain configuration may also be a good set up for tournament gaming, where display 608 may be daisy-chain connected to display 610 and multiple other displays. There may be only one computer and many displays connected in a daisy chain method in a tournament style gaming scenario. In this scenario, information is passed from one display to the next, thus displaying the same information. This information may be displayed to team members of one team while similarly displayed information may be displayed to team members of a second team. The same information is displayed to team members of different teams on the shared screen region 616 while different information may be displayed to team members on opposing teams via regions 614 and 612.

In another exemplary scenario, embodiments of the invention may be useful when exams are taken in a classroom. In this configuration, it may be useful to have a shared screen region between each individual student and the teacher. This requires each student to have their own computer and display that is connected to the teacher computer and display. Each region may be accessed by the teacher via a non-shared screen region available only to the teacher. The exam may be displayed on the teacher-student shared region, that is not shared with other students, while a student-student shared region, that is not shared with the teacher, may be open book notes available to all students. The teacher non-shared region may present a list of students in the class that the teacher may access at any point. At any point during the exam the teacher may access the teacher-student shared region of any student to assess progress. A student may ask a question via the student-teacher shared screen region causing an indicator to appear by the student's name. The teacher may be able to answer this question via the same student-teacher shared screen region while not interrupting the rest of the class. This screen may be edited by both the student and the teacher.

A display and a computer may interface with a digitizer or scanner. The user may log in or use one of these devices for identification. Upon receipt of the identification the information may be displayed in a preset configuration. Previously stored information may be displayed or, for a first-time user, a standard configuration with new user set up may be displayed.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. A system for displaying information to a first user and a second user, comprising:
    a computer system comprising at least one processor communicatively coupled to a first display and a second display,
    wherein the first display displays a shared screen region to the first user,
    wherein the second display displays the shared screen region to the second user,
    wherein the second display further displays a non-shared screen region to the second user,
    wherein the first display does not display the non-shared screen region to the first user, wherein the non-shared screen region displays information to assist the second user in understanding information displayed in the shared screen region, and wherein the first user and the second user are automatically connected based on a profile of the second user.

2. The system of claim 1, wherein the first display further displays an additional non-shared screen region, and wherein the second display does not display the additional non-shared screen region.

3. The system of claim 1, wherein the computer system comprises a first computer connected to the first display and a second computer connected to the second display.

4. The system of claim 3, wherein the second computer is a tablet computer integrating the second display.

5. The system of claim 1, wherein the non-shared screen region displays information not accessible to the first user.

6. The system of claim 1, wherein the non-shared screen region displays a summary of the information on the shared screen region.

7. The system of claim 1, wherein the non-shared screen region displays information retrieved from the Internet.

8. The system of claim 1, wherein the information displayed on the non-shared screen region updates in response to a change in the information displayed on the shared screen region.

9. The system of claim 1, wherein the first and second displays are oriented so the first and second displays are viewed by the first user and only the second display is viewed by the second user.

10. One or more non-transitory computer-readable media storing computer-executable instructions that, when executed by a processor, perform a method for displaying information to a first user and a second user, comprising:

displaying a shared screen region to the first user on a first display;

displaying the shared screen region to the second user on a second display;

displaying, in a non-shared screen region to the second user on the second display, information to assist the second user in understanding information displayed in the shared screen region, wherein the first display does not display the non-shared screen region to the second user;

displaying, in an additional non-shared screen region to the first user on the first display, information to assist the first user in communicating information to the second user, and wherein the second display does not display the additional non-shared screen region, wherein the first user and the second user are automatically connected based on a profile of the first user.

11. The media of claim 10, wherein information on the non-shared screen region of the second display can be edited by the second user and the information on the shared screen region of the second display can be edited by the first user simultaneously.

12. The media of claim 10, wherein the information displayed on the first and second displays can be edited by the first user.

13. The media of claim 10, wherein the second display is used to verify an identity of the second user.

14. The media of claim 10, wherein information indicative of a first edit displayed in the shared screen region of the first display is reflected in the shared screen region of the second display and information indicative of a second edit displayed in the shared screen region of the first display is not reflected in the shared screen region of the second display.

15. A method for displaying information to a first user and a second user, comprising:

automatically connecting the first user and the second user based on a profile of the first user;

displaying a shared screen region to the first user on a first display of a first computer; and displaying the shared screen region to a second user on a second display and a non-shared screen region on the second display displays information to assist the second user in understanding information displayed in the shared screen region, wherein the second display is associated with a second computer, wherein the second display further displays a non-shared screen region to the second user, wherein the first display does not display the non-shared screen region to the first user, and wherein the second user edits the non-shared information displayed in the non-shared region of the second display and the shared information displayed in the shared region of the first and second displays.

16. The method of claim 15, wherein the first display further displays an additional non-shared screen region, and wherein the second display does not display the additional non-shared screen region.

17. The method of claim 16, wherein the non-shared information displayed on the additional non-shared screen region of the first display and shared information displayed on the shared screen region of the first and second displays can be edited by the first user.

18. The method of claim 15, wherein the non-shared region of the first display displays the edits of the second user when the second user edits the non-shared information displayed in the non-shared region of the second display.

19. The method of claim 15, wherein the second user is able to control the information displayed on the first and second displays.

20. The method of claim 15, wherein the second computer is a mobile device integrating the second display.

* * * * *